US009626816B2

(12) United States Patent
Clark et al.

(10) Patent No.: US 9,626,816 B2
(45) Date of Patent: *Apr. 18, 2017

(54) PHYSICAL ACCESS REQUEST AUTHORIZATION

(71) Applicant: International Business Machines Corporation, Armonk, NY (US)

(72) Inventors: Michael A. Clark, Longmont, CO (US); Kenneth T. Gambon, Erie, CO (US); Bret W. Lehman, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/155,498

(22) Filed: May 16, 2016

(65) Prior Publication Data
US 2016/0260273 A1    Sep. 8, 2016

Related U.S. Application Data

(63) Continuation of application No. 13/850,314, filed on Mar. 26, 2013, now Pat. No. 9,378,600.

(51) Int. Cl.
*G07C 9/00* (2006.01)
*G06F 21/40* (2013.01)
(Continued)

(52) U.S. Cl.
CPC ......... *G07C 9/00182* (2013.01); *G06F 21/40* (2013.01); *G06F 21/70* (2013.01);
(Continued)

(58) Field of Classification Search
CPC .......... G06F 21/40; G06F 21/70; G06F 21/86; G06F 21/88; G07C 9/00; G07C 9/00007; G07C 9/00103; G07C 9/00166
See application file for complete search history.

(56) References Cited

U.S. PATENT DOCUMENTS 5,205,436 A * 4/1993 Savage ............... A47F 3/02
  221/1
5,615,622 A * 4/1997 Moses ............... E05G 5/003
  109/2

(Continued)

OTHER PUBLICATIONS

Clark et al., "Physical Access Request Authorization", U.S. Appl. No. 13/850,314, filed Mar. 26, 2013, 27 pages.

(Continued)

*Primary Examiner* — Theodore C Parsons
(74) *Attorney, Agent, or Firm* — Alexander G. Jochym

(57) ABSTRACT

In a method for controlling physical access to a computing device a first access request to a room containing the computing device is received. In response, a processor determines that the first access request is valid based on the room and the date and time of the first access request and unlocks a door to the room to permit entry to the room. Subsequently, a second access request to a cabinet that is located in the room and contains the computing device is received. In response, a processor determines that the second access request is valid based on the cabinet and the date and time of the second access request and unlocks the cabinet to permit access to the computing device.

18 Claims, 4 Drawing Sheets

(51) Int. Cl.
*G06F 21/88* (2013.01)
*G06F 21/86* (2013.01)
*G06F 21/70* (2013.01)
*G06Q 10/10* (2012.01)
*G06F 21/00* (2013.01)

(52) U.S. Cl.
CPC .............. *G06F 21/86* (2013.01); *G06F 21/88* (2013.01); *G06Q 10/105* (2013.01); *G07C 9/00* (2013.01); *G07C 9/00007* (2013.01); *G07C 9/00103* (2013.01); *G07C 9/00166* (2013.01); *G07C 9/00896* (2013.01)

(56) References Cited

U.S. PATENT DOCUMENTS

| | | | | | |
|---|---|---|---|---|---|
| 5,682,142 | A * | 10/1997 | Loosmore | ................ | G07C 1/10 235/385 |
| 6,581,161 | B1 * | 6/2003 | Byford | .................... | G06F 21/32 705/55 |
| 7,457,762 | B2 * | 11/2008 | Wetzer | .................... | G06Q 10/06 705/7.25 |
| 8,219,541 | B2 * | 7/2012 | Magnuson | ............. | G06Q 10/04 707/608 |
| 2007/0222554 | A1 * | 9/2007 | Hart | .................... | G07C 9/00071 340/5.6 |
| 2008/0216156 | A1 * | 9/2008 | Kosaka | ................ | G06Q 20/206 726/4 |
| 2010/0251247 | A1 * | 9/2010 | Pedersen | ................ | G06Q 10/06 718/102 |
| 2012/0095797 | A1 * | 4/2012 | Nishimura | ........ | G06Q 10/06311 705/7.13 |
| 2012/0213362 | A1 * | 8/2012 | Bliding | ............. | G07C 9/00309 380/44 |
| 2012/0297445 | A1 * | 11/2012 | Nishimura | ........... | G06Q 10/103 726/1 |
| 2015/0081367 | A1 * | 3/2015 | Westlake | ......... | G06Q 10/06311 705/7.15 |

OTHER PUBLICATIONS

Appendix P—List of IBM Patents or Patent Applications Treated as Related, 2 Pages.

* cited by examiner

PHYSICAL ACCESS REQUEST AUTHORIZATION

FIELD OF THE INVENTION

The present invention relates generally to the field of change management and more specifically to authorizing an access request to complete a change activity.

BACKGROUND OF THE INVENTION

In the field of information technology (IT), change management generally refers to a system or process for managing change activities to the IT environment. During day to day operations in a data center there are change activities to modify software or hardware components in an equipment cabinet residing in a data center. These changes must be carefully coordinated with system owners and data center owners via a change management process so impact to business operations is minimized or eliminated.

When human resources are relied upon to assess the impact of proposed changes to often intricate information technology infrastructures, even well planned and well organized changes can fail. In fact, many leading information technology analysts have indicated that failed changes are often a major cause of system outages and errors, which may result in a business suffering negative consequences such as financial loss, project delays, customer dissatisfaction, etc.

Change management procedures involve manually creating change requests (uniquely identified with a change request identification number) that specifies, among other things, which device will be undergoing change activity, the nature of the change, the date and time the change activity is scheduled to occur, as well as the individuals that will be performing the change. A change request will have from one to many "approvers" that have a vested interest in the change activity, either via an end-user, system owner, or interested party role. However, in the quest for expediency, or simply through negligence, the change management process is at times not followed, and activities are performed without required approvals. This often occurs during periods when this activity could be performed and undetected. This is referred to as an "unauthorized change."

A more efficient change management process may reduce costs and unauthorized changes and improve productivity and system up-time.

SUMMARY

Aspects of an embodiment of the present invention disclose a method, computer program product, and computing system for controlling physical access to a computing device. A first access request to a room containing the computing device is received. In response, a processor determines that the first access request is valid based on the room and the date and time of the first access request and unlocks a door to the room to permit entry to the room. Subsequently, a second access request to a cabinet that is located in the room and contains the computing device is received. In response, a processor determines that the second access request is valid based on the cabinet and the date and time of the second access request and unlocks the cabinet to permit access to the computing device.

DETAILED DESCRIPTION

Figure 1:
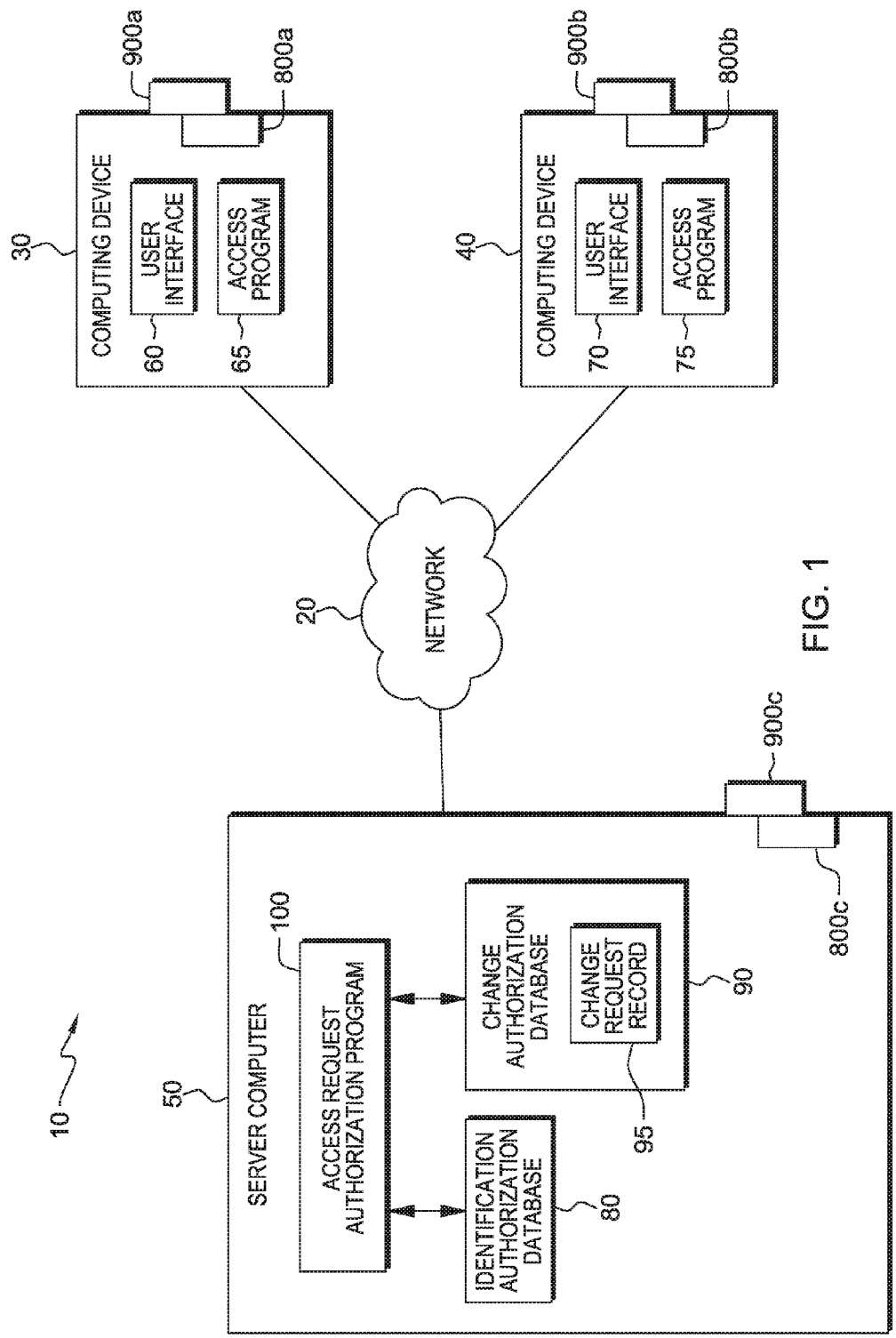
FIG. 1 is a functional block diagram of a computing system, in accordance with an embodiment of the present invention.

The present invention will now be described in detail with reference to the Figures. FIG. 1 depicts computing system 10 in accordance with one embodiment of the present invention. FIG. 1 provides only an illustration of one embodiment and does not imply any limitations with regard to the environments in which different embodiments may be implemented.

In the depicted embodiment, computing system 10 includes computing device 30, computing device 40, and server computer 50 interconnected over network 20. Network 20 may be a local area network (LAN), a wide area network (WAN) such as the Internet, a combination of the two or any combination of connections and protocols that will support communications between computing device 30, computing device 40, and server computer 50 in accordance with embodiments of the invention. Network 20 may include wired, wireless, or fiber optic connections. Computing system 10 may include additional server computers, client computers, or other devices not shown.

Server computer 50 may be a management server, web server, or any other electronic device or computing system capable of receiving and sending data. In other embodiments, server computer 50 may represent a server computing system utilizing multiple computers as a server system, such as in a cloud computing environment. Server computer 50 contains identification authorization database 80, change authorization database 90, and access request authorization program 100.

Identification authorization database 80 is a database that may be written and read by access request authorization program 100. For example identification authorization database 80 may be a database such as an IBM® DB2® database or an Oracle® database. Identification authorization database 80 is located on computer server 50. In another embodiment, identification authorization database 80 may be located on another system or another computing device, provided that identification authorization database 80 is accessible to access request authorization program 100.

Identification authorization database 80 contains identification data for all users who have access to a facility (e.g., data center). In one embodiment, identification data may be fingerprint data of a user, an identification number associated with a user, a badge number associated with a user, or any other type of data that is uniquely associated with a user.

Change authorization database 90 is a database that may be written and read by access request authorization program 100. For example change authorization database 90 may be a database such as an IBM® DB2® database or an Oracle® database. Change authorization database 90 is located on server computer 50. In another embodiment, change authorization database 90 may be located on another system or another computing device, provided that change authorization database 90 is accessible to access request authorization program 100.

Change authorization database 90 contains at least one change request number and conditions associated with the at least one change request number. In one embodiment, conditions associated with the at least one change request number may be the equipment to undergo a change activity, the facility containing the equipment, a range of the date and time the change activity is scheduled to occur, the individual who will perform the change activity, a combination of these requirements, or any combination of possible requirements.

Computing devices 30 and 40 may be badge readers (magnetic stripe or radio-frequency identification (RFID)) integrated with keypads; fingerprint scanners integrated with keypads; desktop computers integrated with badge readers, iris scanners, or fingerprint scanners; or laptop computers integrated with badge readers, iris scanners, or fingerprint scanners. In general, computing devices 30 and 40 may be any electronic device or computing system capable of accepting user input and communicating with server computer 50 over network 20. For example, a user input may comprise data such as identification data (e.g., fingerprint data of a user, an identification number associated with a user, a badge number associated with a user, etc.), a number entered on a keypad or touch screen, or any other information that may be obtained by computing devices 30 and 40. In one embodiment, computing devices 30 and 40 control access to associated access points (e.g., a facility access door and an equipment access lock, respectively).

User interfaces 60 and 70 execute on computing devices 30 and 40, respectively. User interfaces (UI) 60 and 70 operate to visualize content, such as menus and icons, and to allow a user to interact with an application accessible to computing devices 30 and 40, respectively. In one embodiment, UI 60 and 70 comprise interfaces to access programs 65 and 75, respectively. For example, UI 60 may display data received from access program 65 and send user input data to access program 65. UI 70 may display data received from access program 75 and send user input data to access program 75. In other embodiments, UI 60 and UI 70 may comprise one or more interfaces such as, an operating system interface and/or application interfaces.

Access program 65 and access program 75 are standard access point security programs for controlling access to an access point such as software for a badge reader device. In general, access programs 65 and 75 may be any program that can receive user input data and send and receive data over network 20.

A change activity to modify software or hardware components in an equipment cabinet residing in a data center may require a change request. For example, the software or hardware components may reside in a locked equipment cabinet located within the data center. A change request record 95 is generated through the coordination of system owners and data center owners. The change request is uniquely identified by a change request number, and specifies conditions associated with the change request number that must be met, such as which equipment (for example, a computer) will undergo the change activity, the facility/computer room, containing the equipment, a range of the date and time the change activity is scheduled to occur, and the individual or set of individuals who will perform the change. The change request is approved by one or more individuals who have a vested interest in the change activity, such as an end-user, a system owner, or other interested party role. All individuals listed as approvers must agree to all of the terms listed in the change request before it is approved and work can proceed.

Once approved, access request authorization program 100 can read the change request record to determine if a computer service person is authorized to access the computer room and computer cabinet at the date and time that the computer service person attempts to unlock the computer room and cabinet. In one embodiment, access request authorization program 100 determines if identification data of a user received from access program 65, over network 20, matches identification data in identification authorization database 80. Access request authorization program 100 also determines if the conditions associated with a change request number received from access program 65 are met. If access request authorization program 100 determines that the identification data of the user matches identification data in identification authorization database 80 and access request authorization program 100 determines that the conditions associated with the change request number are met, access request authorization program 100 sends an instruction to access program 65 to approve facility access.

In one embodiment, access request authorization program 100 determines if identification data of a user received from access program 75, over network 20, matches identification data in identification authorization database 80. Access request authorization program 100 also determines if the conditions associated with the change request number received from access program 75 are met. If access request authorization program 100 determines that the identification data of the user matches identification data in identification authorization database 80 and access request authorization program 100 determines that the conditions associated with the change request number are met, access request authorization program 100 sends an instruction to access program 75 to approve equipment access.

In one embodiment, access request authorization program 100 resides on server computer 50. In another embodiment, access request authorization program 100 may reside on another server or another computing device (e.g., computing device 30 and/or 40), provided that access request authorization program 100 as access to identification authorization database 80 and change authorization database 90.

Computing device 30, computing device 40, and server computer 50 each maintain respective internal components 800a, 800b, and 800c, and respective external components 900a, 900b, and 900c. In general, client computer 30, client computer 40, and server computer 50 can be any computing system as described in further detail with respect to FIG. 4.

Figure 2:
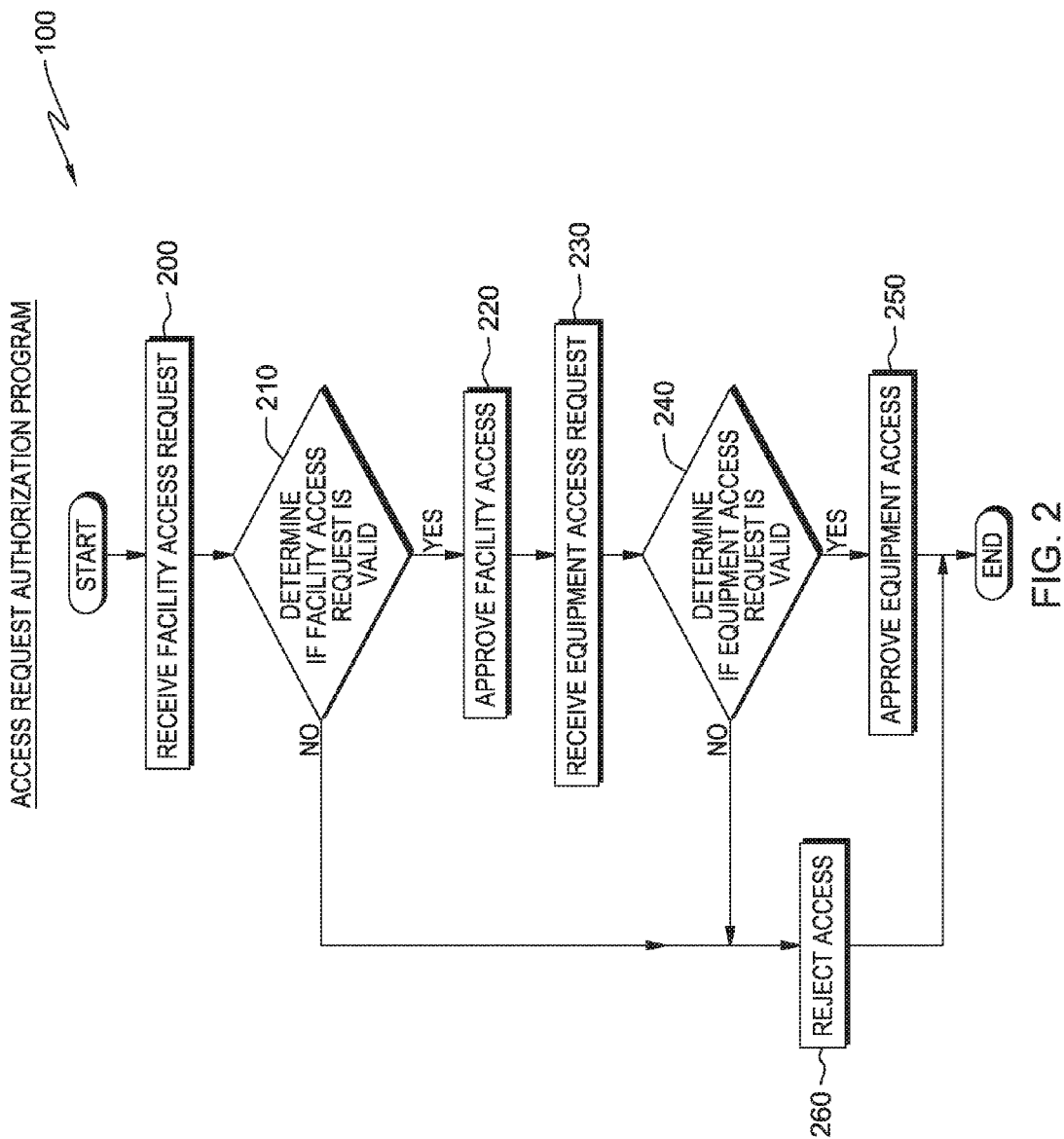
FIG. 2 depicts a flowchart of the steps of an access request authorization program executing within the computing system of FIG. 1, for authorizing access requests to complete a change activity, in accordance with one embodiment of the present invention.

FIG. 2 depicts a flowchart of the steps of access request authorization program 100 executing within the computing system of FIG. 1, for authorizing an access request to complete a change activity, in accordance with one embodiment of the present invention.

Initially, a user at computing device 30 requests access to a facility containing equipment to undergo a change activity. In one embodiment, the user inputs his or her identification data and enters a change request number using user interface 60 of computing device 30. In another embodiment, the user inputs his or her identification data using user interface 60 of computing device 30 and is prompted by user interface 60 to enter a change request number after access request authorization program 100 determines that the identification data of a user matches identification data in identification authorization database 80. User interface 60 sends the identification data and the change request number to access program 65. Access program 65 sends the identification data associated with the user and the change request number to access request authorization program 100 over network 20.

In step 200, access request authorization program 100 receives a facility access request from access program 65. In one embodiment, access request authorization program 100 receives identification data associated with the user and the change request number from access program 65.

Access request authorization program 100 determines if the facility access request is valid (decision 210). In one embodiment, access request authorization program 100 queries identification authorization database 80 to determine if the identification data associated with the user matches identification data in identification authorization database 80. If access request authorization program 100 determines that the identification data associated with the user does not match identification data in identification authorization database 80 the facility access request is determined to be not valid (decision 210, No branch). In step 260, access request authorization program 100 rejects the access request. In one embodiment, access request authorization program 100 sends an instruction to access program 65 to deny access to the facility. Access request authorization program 100 may also log the rejected access request and the reason for the rejection on change authorization database 90. The logged rejected access request may also include a time stamp indicating when the rejection was made.

If access request authorization program 100 determines that the identification data associated with the user does match identification data in identification authorization database 80, access request authorization program 100 queries change authorization database 90 to retrieve the conditions associated with the change request number. In another embodiment, if the user did not input the change request number along with his or her identification data access request authorization program 100 sends an instruction to access program 65 to prompt the user to provide the change request number.

Access request authorization program 100 determines if the conditions associated with the change request number are met. In one embodiment, the conditions associated with the change request number include a range of the date and time the change activity must occur, a specific individual who must perform the change activity, the equipment to undergo the change activity, and the facility containing the equipment. In one embodiment, when a facility access request is being validated the conditions that need to be met are a range of the date and time the change activity must occur, a specific individual or set of individuals who must perform the change activity, and the facility containing the equipment.

Access request authorization program 100 compares the range of the date and time the change activity must occur to the date and time the facility access request was made by the user to determine if the date and time the facility access request was made falls within the range of date and time the change activity must occur. In one embodiment, the facility access request (e.g., identification data associated with the user and/or the change request number) sent by access program 65 over network 20 is time stamped. In another embodiment, server computer 50 contains an internal clock to determine when the facility access request was received.

Access request authorization program 100 also compares the specific individual who must perform the change activity to the user who is associated with the identification data to determine if the user matches the specific individual or set of individuals who must perform the change activity. In one embodiment, the identification data is associated with a name of a user and access request authorization program 100 determines if the name of the user matches the name of the specific individual who must perform the change activity.

Access request authorization program 100 also compares the facility containing the equipment to undergo the change activity to the facility associated with computing devices 30 to determine if the facility containing the equipment to undergo the change activity matches the facility associated with computing devices 30. In one embodiment, the facility access request (e.g., identification data associated with the user and/or the change request number) sent by access program 65 over network 20 is tagged with metadata indicating the computing device the request came from and/or the facility associated with computing device 30.

If access request authorization program 100 determines that the conditions associated with the change request number are not met the facility access request is determined to be not valid (decision 210, No branch). In step 260, access request authorization program 100 rejects the access request. In one embodiment, access request authorization program 100 sends an instruction to access program 65 to deny access to the facility. Access request authorization program 100 may also log the rejected access request and the reason for the rejection on change authorization database 90. The logged rejected access request may also include a time stamp indicating when the rejection was made.

If access request authorization program 100 determines that the conditions associated with the change request number are met, the facility access request is determined to be valid (decision 210, Yes branch) and access request authorization program 100 proceeds to step 220.

In step 220, access request authorization program 100 approves the facility access request. In one embodiment, access request authorization program 100 sends an instruction over network 20 to access program 65 to grant access to the facility to the user. The user gains physical access to the facility containing the equipment to undergo the change activity. In one embodiment, an equipment access request is required in order to access the cabinet that houses the equipment to undergo the change activity. In another embodiment, an equipment access is not required to access the cabinet that houses the equipment to undergo the change activity. The user at computing device 40 requests access to equipment to undergo a change activity. The process of the user requesting access to the equipment to undergo a change activity is similar to the process described above with respect to the user requesting facility access.

In step 230, access request authorization program 100 receives an equipment access request from access program 75. In one embodiment, access request authorization program 100 receives identification data associated with the user and the change request number from access program 75.

Access request authorization program 100 determines if the equipment access request is valid (decision 240). The process of decision 240 is similar to the described process with respect to decision 210 above. A difference occurs with respect to the conditions associated with the change request. In one embodiment, when a equipment access request is being validated the conditions that need to be met are a range of the date and time the change activity must occur, a specific individual who must perform the change activity, and the equipment to undergo the change activity. The facility containing the equipment to undergo the change activity is not considered in this step.

Access request authorization program 100 compares the equipment to undergo the change activity to the equipment associated with computing devices 40 to determine if the equipment to undergo the change activity matches the equipment associated with computing devices 40. In one embodiment, the facility access request (e.g., identification data associated with the user and/or the change request number) sent by access program 75 over network 20 is tagged with metadata indicating the computing device the request came from and/or the equipment associated with computing device 40.

In step 250, access request authorization program 100 approves the equipment access request. In one embodiment, access request authorization program 100 sends an instruction over network 20 to access program 75 to grant access to the equipment to undergo the change activity to the user.

In another embodiment, after an administrator creates and approves a change request, access request authorization program 100 sends the change request number associated with the change request to access program 65 and access program 75. Access request authorization program 100 also sends conditions associated with the change request number to access program 65 and access program 75. In this embodiment, access programs 65 and 75 have the functionality to perform steps 200 though 250 described generally above.

In yet another embodiment, access request authorization program 100 may perform additional steps similar to steps 200 through 220. Theses steps are performed in response to an additional access request for access to a specific component of the equipment to undergo the change activity. The process is similar to the described process with respect to decision 210 above. A difference occurs with respect to the conditions associated with the change request. In one embodiment, when a specific component access is being validated the conditions that need to be met are a range of the date and time the change activity must occur, a specific individual or set of individuals who must perform the change activity, and the specific component or components of the equipment to undergo the change activity. The facility containing the equipment to undergo the change activity and the equipment to undergo the change activity is not considered in this step as it was previously determined to be an authorized access attempt via steps 200-250. This would provide a third layer of protection. As part of this process, all authentication requests would be logged for audit and security purposes.

Figure 3:
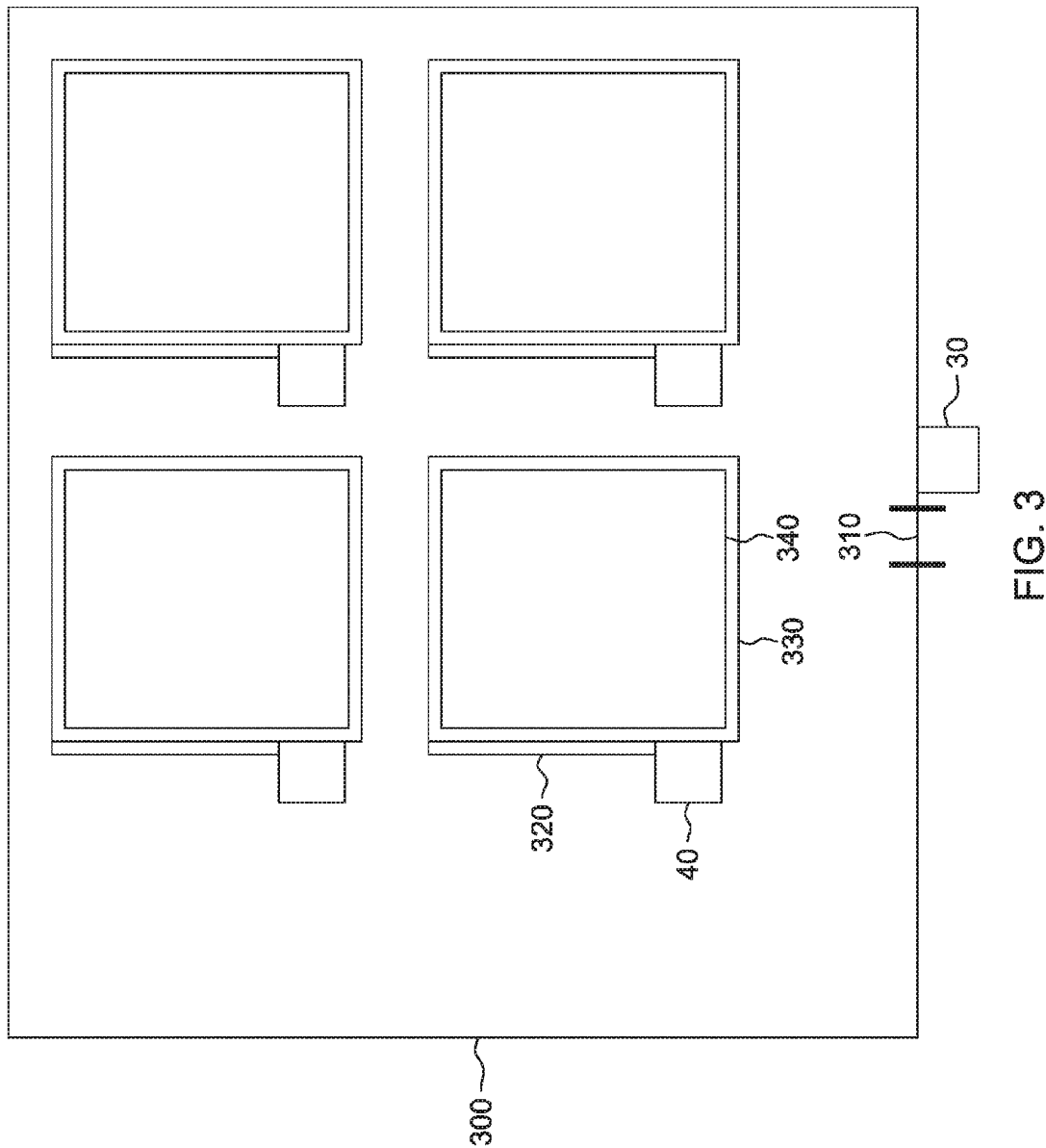
FIG. 3 depicts a computer room with a locked door for a computer enclosed in a locked cabinet, in accordance with one embodiment of the present invention.

FIG. 3 depicts a use-case scenario in accordance with one embodiment of the present invention. FIG. 3 depicts a data center/computer room 300 with a locked door 310. Computer room 300 contains computing equipment 340 within a cabinet/housing 330 with a locked access panel 320. For example, the computing equipment 340 comprises one or more printed circuit boards with electronic components (i.e. processor, memory, etc.), and cabinet/housing 330 is a sheet metal box with one or more racks that contain the printed circuit boards of computing equipment 340. A user requests access to data center 300 at door 310 using computing device 30. The user inputs his or her identification data and a change request number at computing device 30. Access request authorization program 100 determines whether the request for access to data center 300 is valid (step 210 above). If access request authorization program 100 determines that the request for access to data center 300 is valid, then access request authorization program 100 sends a signal to computing device 30 to unlock door 310 (by electronic control) and allow the user access to data center 300.

After the user enters data center 300, the user requests access to cabinet/housing 330 which houses computing equipment 340. The user requests access to cabinet/housing 330 at access panel 320 using computing device 40. For example, access panel 320 is a metal panel with a hinge on one side and an electronic lock on the opposite side. In another example access panel 320 may be a metal panel on a track that may be moved along the track to open and close access to cabinet/housing 330. In another example the electronic lock may be located on cabinet/housing 330 or at any other location such that the electronic lock may control whether access panel 320 may be opened. The electronic lock is connected to computing device 40 by a dedicated wire. The user inputs his or her identification data and the change request number at computing device 40. Access authorization request program determines whether the request for access to cabinet/housing 330 is valid (step 240 above). If access request authorization program 100 determines that the request for access to cabinet/housing 330 is valid, then access request authorization program 100 sends a signal to computing device 40 to unlock access panel 320 (by electronic control) and allow the user access to cabinet/housing 330 to update computing equipment 340. The signal to unlock access panel 320 is sent from computing device 40 to the electronic lock on access panel 320 over the dedicated wire.

Figure 4:
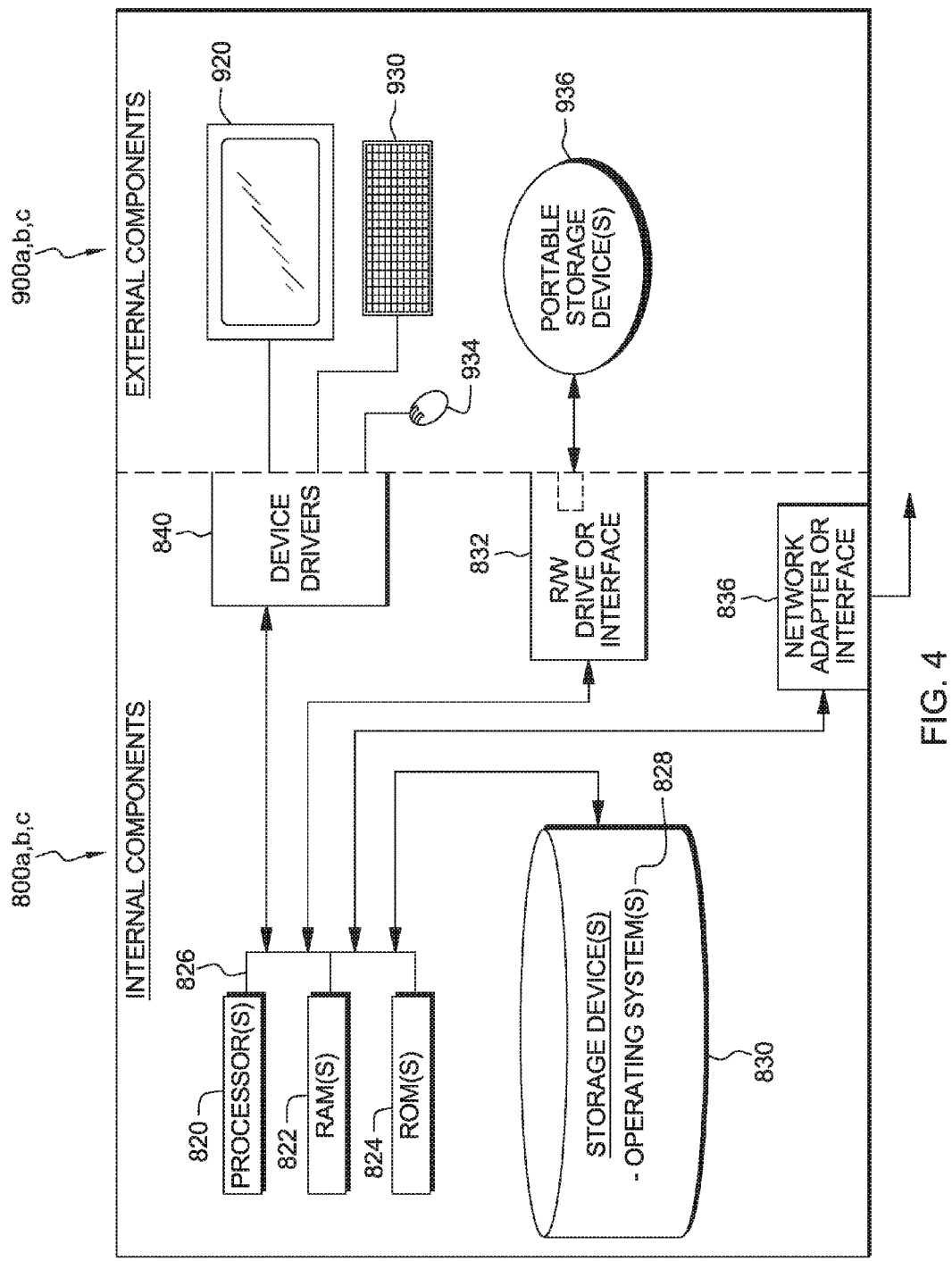
FIG. 4 is a block diagram of internal and external components of the computing devices and the server computer of FIG. 1 in accordance with one embodiment of the present invention.

FIG. 4 is a block diagram of internal and external components of computing device 30, computing device 40, and server computer 50 in accordance with one embodiment of the present invention.

Computing device 30, computing device 40, and server computer 50 include respective sets of internal components 800*a,b,c* and external components 900*a,b,c,* illustrated in FIG. 4. Each of the sets of internal components 800*a,b,c* includes one or more processors 820, one or more computer-readable RAMs 822 and one or more computer-readable ROMs 824 on one or more buses 826, one or more operating systems 828 and one or more computer-readable storage devices 830. The one or more operating systems 828 and user interface 60 and access program 65 (for computing device 30), user interface 70 and access program 75 (for computing device 40), and identification authorization database 80, change authorization database 90, change request record 95, and access request authorization program 100 (for server computer 50) are stored on one or more of the respective computer-readable storage devices 830 for execution and/or access by one or more of the respective processors 820 via one or more of the respective RAMs 822 (which typically include cache memory). In the illustrated embodiment, each of the computer-readable storage devices 830 is a magnetic disk storage device of an internal hard drive. Alternatively, each of the computer-readable storage devices 830 is a semiconductor storage device such as ROM 824, EPROM, flash memory or any other computer-readable storage device that can store a computer program and digital information. The term "computer-readable storage device" does not encompass a signal propagation media such as a copper cable, optical fiber or wireless transmission media.

Each set of internal components 800*a,b,c* also includes a R/W drive or interface 832 to read from and write to one or more portable computer-readable storage devices 936 such as a CD-ROM, DVD, memory stick, magnetic tape, magnetic disk, optical disk or semiconductor storage device. User interface 60 and access program 65 (for computing device 30), user interface 70 and access program 75 (for computing device 40), and identification authorization database 80, change authorization database 90, change request record 95, and access request authorization program 100 (for server computer 50) can be stored on one or more of the respective portable computer-readable storage devices 936, read via the respective R/W drive or interface 832 and loaded into the respective hard drive or semiconductor storage device 830.

Each set of internal components 800a,b,c also includes a network adapter or interface 836 such as a TCP/IP adapter card or wireless communication adapter (such as a 4G wireless communication adapter using OFDMA technology). User interface 60 and access program 65 (for computing device 30), user interface 70 and access program 75 (for computing device 40), and identification authorization database 80, change authorization database 90, change request record 95, and access request authorization program 100 (for server computer 50) can be downloaded to the respective computing/processing devices from an external computer or external storage device via a network (for example, the Internet, a local area network or other, wide area network or wireless network) and network adapter or interface 836. From the network adapter or interface 836, the programs are loaded into the respective hard drive or semiconductor storage device 830. The network may comprise copper wires, optical fibers, wireless transmission, routers, firewalls, switches, gateway computers and/or edge servers.

Each of the sets of external components 900a,b,c includes a display screen 920, a keyboard or keypad 930, and a computer mouse or touchpad 934. Each of the sets of internal components 800a,b,c also includes device drivers 840 to interface to display screen 920 for imaging, to keyboard or keypad 930, to computer mouse or touchpad 934, and/or to display screen for pressure sensing of alphanumeric character entry and user selections. The device drivers 840, R/W drive or interface 832 and network adapter or interface 836 comprise hardware and software (stored in storage device 830 and/or ROM 824).

The programs can be written in various programming languages (such as Java, C+) including low-level, high-level, object-oriented or non object-oriented languages. Alternatively, the functions of the programs can be implemented in whole or in part by computer circuits and other hardware (not shown).

Based on the foregoing, a computer system, method and program products have been disclosed for authorizing an access request to complete a change activity. However, numerous modifications and substitutions can be made without deviating from the scope of the present invention. Therefore, the present invention has been disclosed by way of example and not limitation.

What is claimed is:

1. A method for controlling physical access to a computing device the method comprising:
   receiving a first access request to a room containing the computing device, and one or more processors determining whether the first access request is valid based on the room and the date and time of the first access request, wherein responsive to determining the first access request is valid unlocking a door to the room to permit entry to the room;
   subsequently, receiving a second access request to a cabinet that is located in the room and contains the computing device, and one or more processors determining whether the second access request is valid based on the cabinet and the date and time of the second access request, wherein responsive to determining the second access request is valid unlocking the cabinet to permit access to the computing device; and
   wherein the first access request comprises a first identification data and a first change request number and the second access request comprises a second identification data and a second change request number, wherein the first and second change request numbers are associated with one or more conditions, wherein two or more individuals listed as approvers of the first and second change request numbers agree to all conditions of the one or more conditions of the first and second change request number.

2. The method of claim 1, wherein the one or more conditions comprises a time range in which access to the computing device is allowed.

3. The method of claim 2, wherein the step of determining, by the one or more processors, whether the first access request is valid comprises the step of determining, by the one or more processors, whether the date and time of the first access request falls within the time range; and
   wherein the step of determining, by the one or more processors, whether the second access request is valid comprises the step of determining, by the one or more processors, whether the date and time of the second access request falls within the time range.

4. The method of claim 1 further comprising the step of:
   receiving a third access request to a specific part of the computing device in the cabinet, and, one or more processors determining whether the third access request is valid based on the specific part of the computing device and the date and time of the third access request, wherein responsive to determining the third access request is valid approving access to the specific part of the computing device; and
   wherein the third access request comprises a third identification data and a third change request number, wherein the third change request numbers are associated with one or more conditions, wherein two or more individuals listed as approvers of the third change request number agree to all conditions of the one or more conditions of the third change request number.

5. The method of claim 4, wherein the one or more conditions comprises a time range in which access to the specific part of the computing device is allowed.

6. The method of claim 5, wherein the step of determining, by the one or more processors, whether the first access request is valid comprises the step of determining, by the one or more processors, whether the date and time of the first access request falls within the time range; wherein the step of determining, by the one or more processors, whether the second access request is valid comprises the step of determining, by the one or more processors, whether the date and time of the second access request falls within the time range; and wherein the step of determining, by the one or more processors, whether the third access request is valid comprises the step of determining, by the one or more processors, whether the date and time of the third access request falls within the time range.

7. A computer program product for controlling physical access to a computing device, the computer program product comprising:
   one or more computer-readable storage devices and program instructions stored on the one or more computer-readable storage devices, the program instructions comprising:
   program instructions to receive a first access request to a room containing the computing device, and program instructions to determine whether the first access request is valid based on the room and the date and time of the first access request, wherein responsive to determining the first access request is valid unlock a door to the room to permit entry to the room;

subsequently, program instructions to receive a second access request to a cabinet that is located in the room and contains the computing device, and program instructions to determine whether the second access request is valid based on the cabinet and the date and time of the second access request, wherein responsive to determining the second access request is valid unlock the cabinet to permit access to the computing device; and wherein the first access request comprises a first identification data and a first change request number and the second access request comprises a second identification data and a second change request number, wherein the first and second change request numbers are associated with one or more conditions, wherein two or more individuals listed as approvers of the first and second change request numbers agree to all conditions of the one or more conditions of the first and second change request number.

8. The computer program product of claim 7, wherein the one or more conditions comprises a time range in which access to the computing device is allowed.

9. The computer program product of claim 8, wherein the program instructions to determine whether the first access request is valid comprise program instructions to determine whether the date and time of the first access request falls within the time range; and wherein the program instructions to determine whether the second access request is valid comprise program instructions to determine whether the date and time of the second access request falls within the time range.

10. The computer program product of claim 7 further comprising:

program instructions stored on the one or more computer-readable storage devices, to receive a third access request to a specific part of the computing device in the cabinet, and program instructions to determine whether the third access request is valid based on the specific part of the computing device and the date and time of the third access request, wherein responsive to determining the third access request is valid approve access to the specific part of the computing device; and wherein the third access request comprises a third identification data and a third change request number, wherein the third change request numbers are associated with one or more conditions, wherein two or more individuals listed as approvers of the third change request number agree to all conditions of the one or more conditions of the third change request number.

11. The computer program product of claim 10, wherein the one or more conditions comprises a time range in which access to the specific part of the computing device is allowed.

12. The computer program product of claim 11, wherein the program instructions to determine whether the first access request is valid comprise program instructions to determine whether the date and time of the first access request falls within the time range; wherein the program instructions to determine whether the second access request is valid comprise program instructions to determine whether the date and time of the second access request falls within the time range; and wherein program instructions to determine whether the third access request is valid comprise program instructions to determine whether the date and time of the third access request falls within the time range.

13. A computer system for controlling physical access to a computing device, the computer system comprising:

one or more computer processors, one or more computer-readable memory devices, one or more computer-readable storage devices, and program instructions stored on the computer-readable storage devices for execution by at least one of the one or more processors via the one or more memory devices, the program instructions comprising:

program instructions to receive a first access request to a room containing the computing device, and program instructions to determine whether the first access request is valid based on the room and the date and time of the first access request, wherein responsive to determining the first access request is valid unlock a door to the room to permit entry to the room; and subsequently, program instructions to receive a second access request to a cabinet that is located in the room and contains the computing device, and program instructions to determine whether the second access request is valid based on the cabinet and the date and time of the second access request, wherein responsive to determining the second access request is valid unlock the cabinet to permit access to the computing device; and wherein the first access request comprises a first identification data and a first change request number and the second access request comprises a second identification data and a second change request number, wherein the first and second change request numbers are associated with one or more conditions, wherein two or more individuals listed as approvers of the first and second change request numbers agree to all conditions of the one or more conditions of the first and second change request number.

14. The computer system of claim 13, wherein the one or more conditions comprises a time range in which access to the computing device is allowed.

15. The computer system of claim 14, wherein the program instructions to determine whether the first access request is valid comprise program instructions to determine that the date and time of the first access request falls within the time range; and wherein the program instructions to determine whether the second access request is valid comprise program instructions to determine that the date and time of the second access request falls within the time range.

16. The computer system of claim 15 further comprising:

program instructions stored on the computer-readable storage devices for execution by at least one of the one or more processors via the one or more memory devices, to receive a third access request to a specific part of the computing device in the cabinet, and program instructions to determine whether the third access request is valid based on the specific part of the computing device and the date and time of the third access request, wherein responsive to determining the third access request is valid approve access to the specific part of the computing device; and wherein the third access request comprises a third identification data and a third change request number, wherein the third change request numbers are associated with one or more conditions, wherein two or more individuals listed as approvers of the third change request number agree to all conditions of the one or more conditions of the third change request number.

17. The computer system of claim 16, wherein the one or more conditions comprises a time range in which access to the specific part of the computing device is allowed.

18. The computer system of claim 17, wherein the program instructions to determine whether the first access request is valid comprise program instructions to determine whether the date and time of the first access request falls within the time range; wherein the program instructions to determine whether the second access request is valid comprise program instructions to determine whether the date and time of the second access request falls within the time range; and wherein program instructions to determine whether the third access request is valid comprise program instructions to determine whether the date and time of the third access request falls within the time range.

* * * * *